United States Patent

[11] 3,556,053

[72] Inventors John Neville Padman
Howlong Road, Albury, New South Wales;
Donald Hadden Cummins, Leneva,
Wodonga, Victoria, Australia
[21] Appl. No. 751,906
[22] Filed Aug. 12, 1968
[45] Patented Jan. 19, 1971

[54] MILKING MACHINES
9 Claims, 11 Drawing Figs.
[52] U.S. Cl. ................................................ 119/14.08,
119/14.1
[51] Int. Cl. .................................................... A01j 07/00
[50] Field of Search............................................ 119/14.08,
14.01, 14.13—14.17, 14.55, 14.1

[56] References Cited
UNITED STATES PATENTS

| 908,449 | 1/1909 | Daniels.......................... | 119/14.08 |
| 2,576,808 | 11/1951 | Perkins.......................... | 119/14.08 |
| 2,902,975 | 9/1959 | Babson.......................... | 119/14.08X |
| 3,115,116 | 12/1963 | Schilling et al. .............. | 119/14.08 |

*Primary Examiner*—Hugh R. Chamblee
*Attorney*—Oberlin, Maky, Donnelly and Renner

ABSTRACT: Apparatus for removing teat cups from milking animals wherein teat cup removing means are operated in response to milk flow detecting means which comprises a flow control means separate and apart from the teat cups, and a flow rate sensing means operable with said flow control means to sense a falling of the milk below a predetermined quantity. Means are actuated in response to the sensing means for closing a flexible milk line and to thereafter apply tension to such milk line to remove the teat cups.

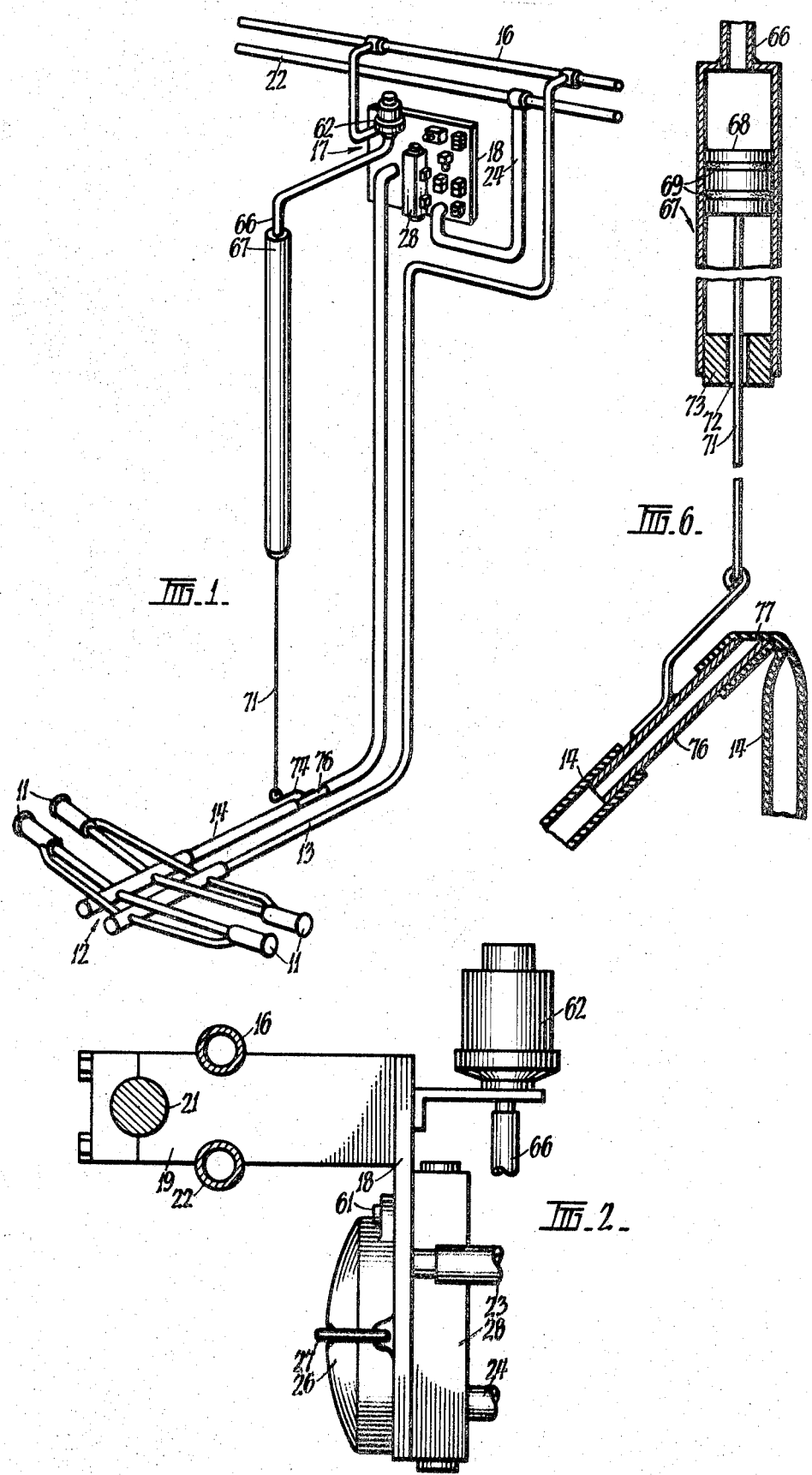

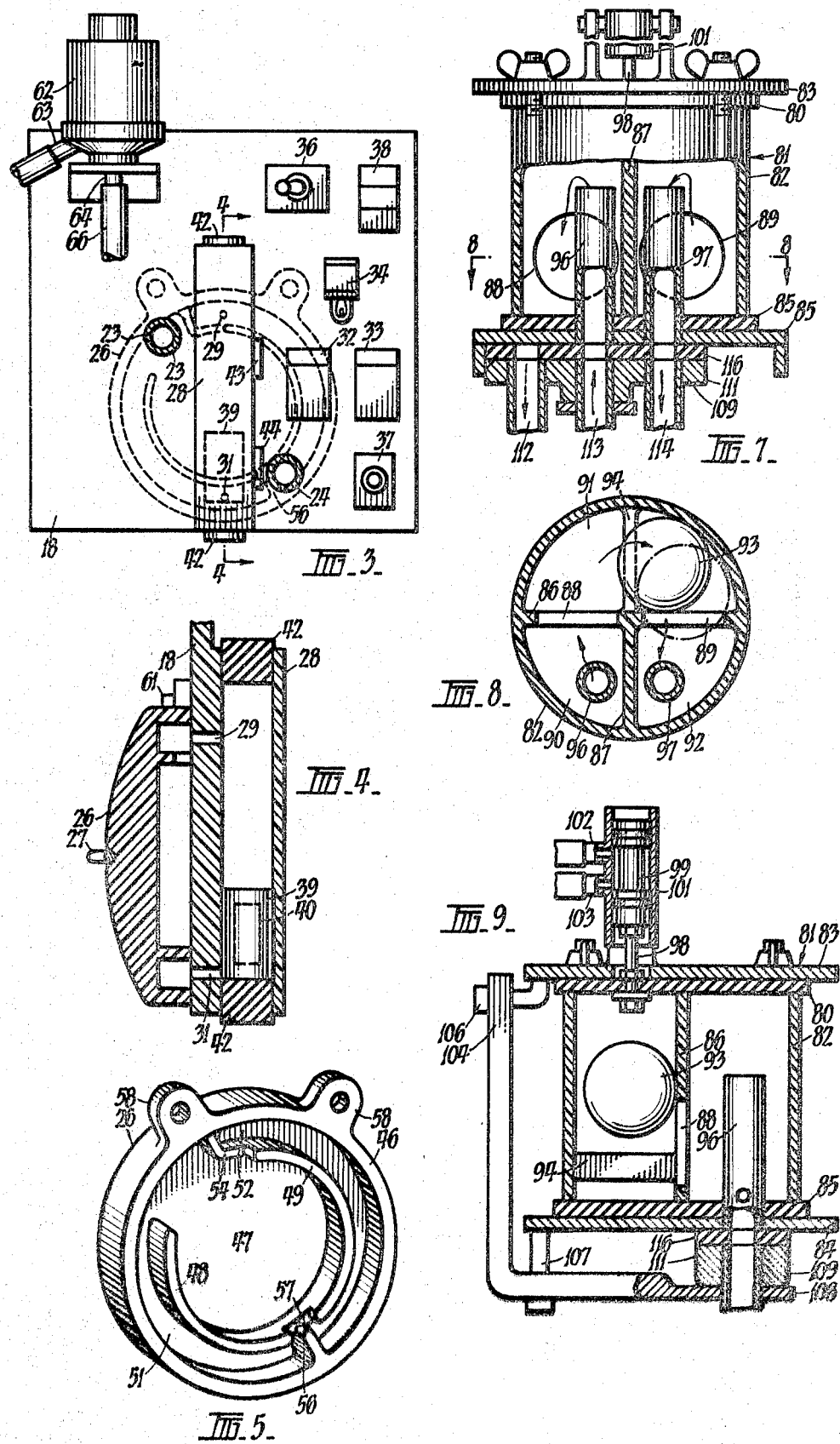

MILKING MACHINES

This invention relates to improvements in and relating to milking machine apparatus and relates particularly to apparatus for use in conjunction with milking machines for the automatic removal of the teat cups when an animal being milked has finished giving milk.

Heretofore, in milking cows, it has been the practice to manually remove the teat cups from a cow when the cow has finished giving milk and it has been necessary to carefully watch each cow to ensure that the teat cups are removed as soon as the cow has finished giving milk. In a milking shed capable of handling simultaneously a relatively large number of cows it has been necessary to employ a number of milking hands so that the milking operation can proceed smoothly and quickly and so that when each cow has finished giving milk the teat cups are immediately removed.

To enable this to be carried out it is a common practice to provide a transparent flow bowl through which the milk given by the cow passes. By observing the flow of milk through the flow bowl a milking hand may clearly ascertain when the cow has finished giving milk.

A large amount of research has been directed at milking procedures for the purpose of increasing the quality and quantity of milk given by dairy cattle and it has been found that the amount of milk given by a cow may be increased if each milking is stopped when the amount of milk being given at milking time decreases to about one-half pound of milk per minute.

With present milking procedures, however, it is difficult to accurately gauge when the flow falls to this minimum level, and it is not possible to remove the teat cups from the cows immediately when the level is reached.

Accordingly it is an object of the present invention to provide means whereby the teat cups may be removed from an animal when the milk flow falls to a predetermined level.

It is another object of the present invention to provide apparatus which automatically removes the teat cups when an animal has finished giving sufficient milk.

It is another object of the invention to provide apparatus which is relatively simple and cheap to operate and which, when in use, permits a minimum number of milking hands to operate the milking apparatus.

A further object of the invention is to provide apparatus which is arranged to remove the teat cups when the cow has finished giving sufficient milk to ensure that the cow when dry is not subject to the action of the milking machine.

According to one aspect there is provided apparatus for removing milking machine teat cups from milking animals comprising milk flow detecting means associated with a flexible milk line connected to a set of teat cups, and teat cup removing means operatively responsive to said milk flow detecting means to remove the teat cups from an animal when the milk flow in the milk line falls below a predetermined quantity.

Preferably the teat cup removing means comprises an elongated cylinder having a vacuum connection means at its upper end, a piston in said cylinder, milk line closure means connected in said flexible milk line adjacent to, but spaced from said set of teat cups, and means extending between said piston and said milk line closure means and operable by movement of said piston in said cylinder responsive to an induced vacuum in said cylinder to cause the milk line closure means to close said flexible milk line and apply tension thereto to remove said teat cups.

Also, it is preferred that the milk flow detecting means comprises flow control means having milk inlet and milk outlet connections, said milk outlet connection being connected to a milk line of the milking machine and said milk inlet connection being connected to said flexible milk line, flow rate sensing means associated with said flow control means and operable with said flow control means to sense a falling of the milk flow below a predetermined quantity, and actuating means responsive to said flow rate sensing means to actuate said teat cup removing means.

In order that the invention may be more readily understood several embodiments thereof will now be described with reference to the accompanying drawings wherein:

FIG. 1 is a general perspective view of one embodiment of the invention;

FIG. 2 is a side elevational view of the control means shown in FIG. 1;

FIG. 3 is a front elevational view of the control means shown in FIG. 1;

FIG. 4 is a sectional side elevation taken along the lines 4—4 in FIG. 3;

FIG. 5 is a perspective view of a flow control plate used in the embodiment of FIGS. 1 to 4;

FIG. 6 is a cross-sectional elevation of the motivating device for removing the teat cups and closing the milk line shown in FIG. 1;

FIG. 7 is a front sectional elevational view of control means of a second embodiment of the invention;

FIG. 8 is a sectional plan view taken along the lines 8—8 in FIG. 7;

FIG. 9 is a sectional side elevational view of the control means of FIGS. 7 and 8;

Figure 10:
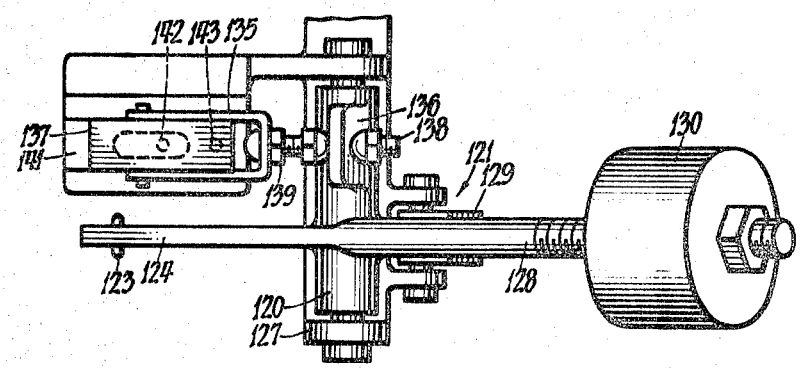
FIG. 10 is a plan view of control means of a third embodiment of the present invention.

Referring to FIGS. 1 to 6, the apparatus illustrated includes a set of standard milking teat cups 11 which are connected in the normal manner to a claw 12 which, in turn, is connected by rubber tubes or hoses 13 and 14 to the vacuum line 16 and a control means 17, respectively.

The control means 17 includes a front mounting plate 18 having a mounting bracket 19 attached to the rear surface thereof and arranged to support the control means 17 in a convenient position in a milking bail. In the embodiment illustrated the mounting bracket 19 is clamped to a structural member 21 in the milking shed and the vacuum line 16 and milk line 22 pass on either side of the bracket 19. A milk inlet tube 23 and an outlet tube 24 are mounted on the front plate 18 and the tubes 23 and 24 communicate through apertures in the front plate 18, with a flow control plate 26 which is held to the rear surface of the front plate 18 by a spring wire clip 27.

A float tube 28 is also mounted on the front plate 18 and two further holes 29 and 31 interconnect the interior of the flow control plate 26 with the interior of the float tube 28.

The electrical control apparatus, consisting of a pair of microswitches 32 and 33, an indicator light 34, a manual switch 36, a reset switch 37, plug connector 38, and electrical wiring (not shown) is all mounted on the front plate 18. A transparent cover (not shown) is arranged to be fastened over the electrical apparatus.

A magnetic float 39, which consists of a solid synthetic plastic float having a magnet 40 sealed inside, is positioned in the float tube 28 and the tube is sealed at both ends by rubber stoppers 42. Two reed switches 43 and 44 are positioned against the float chamber, one adjacent the upper end and the other adjacent the lower end thereof.

The flow control plate 26 consists of a plate having a peripheral front edge face 46 which is arranged to engage with the rear surface of the front mounting plate 18 in a sealing manner, to thus prevent milk, which flows into the plate, leaking therefrom. The flow control plate 26 has a hollowed interior 47 with walls 48 and 49 defining passages 51 and 52, respectively. The passage 51 is open at one end 53 whilst the other passage 52 is partly closed at one end 54. Both passages are terminated at their other respective ends by a wall 56. An aperture 57 is proved in the walls 48 and 49 adjacent the end wall 56.

Two lugs 58 and 59 each having an aperture therein are provided on the flow control plate 26 and the apertures locate on pins 61 extending from the front mounting plate 18 to locate the flow control plate 26 in its correct relative position. The spring clip 27 fastens the control plate 26 to the mounting plate 18.

As seen in FIG. 3, when the flow control plate 26 is in position, the milk inlet tube 23 communicates with the interior 47 and the milk outlet tube 24 communicates with the passageway 52.

A solenoid operated vacuum valve 62 is mounted on the front mounting plate 18 and has its inlet 63 connected to the vacuum line 16. The outlet 64 of the valve 62 connects, by means of rubber hoses 66, to the upper end of an elongated cylinder 67 which is mounted adjacent the control means 17.

A piston 68 having a pair of sealing O-rings 69 is fitted in the cylinder 67 and a cord 71 extends from the bottom of the piston through a hole 72 in a closure 73 at the lower end of the cylinder 67. The free end of the cord 71 is attached to an arm 74 which extends from a rigid tubular pipe 76 connected in the milk line 14 leading from the teat cups claw 12. The end of the pipe 76 adjacent the claw 12 is formed with a bevel 77, as shown in FIG. 6.

The operation of the apparatus is as follows:

The teat cups 11 are applied to the animal to be milked and the vacuum line 13 and milk line 14 operate in the normal manner to induce a flow of milk along the milk line 14. At this time the magnetic float 39 is at its lowest position in the float chamber 28 and the lower reed switch 44 is held open. The electrical circuit, however, has been reset by means of the reset switch 37 which negates the operation of the reed switch 44 and causes the indicator light 34 to operate.

As milk flows through the milk inlet tube 23 and into the interior of the flow control plate, it commences to fill the float chamber 28 through the hole 31. The milk entering the flow control plate initially fills the hollow interior 47 whilst a small amount bleeds into the passageways 51 and 52 through the aperture 57. The float chamber level is controlled by the amount of milk which flows into the passageway 51 and thus, in turn, is controlled by the removal of milk by the outlet tube 24 which communicates with the passageway 52.

When the milk initially begins to flow, the float chamber immediately begins to fill and the float is carried up so that the magnet 40 no longer holds the reed switch 44 open. On reaching a height in the float chamber which corresponds to a flow of milk through the flow control plate of more than, say, one-half pound of milk per minute, the magnetic influence of the magnet 40 causes the reed switch 43 to open to thus preset microswitch 32.

If the flow of milk through the flow control plate 26 exceeds the amount which is drawn through the aperture 57, the level in the flow control plate rises until the milk flows over the partly closed end of the passageway 52, thus partly bypassing the aperture 57.

When the flow decreases to about one-half pound of milk per minute the float 39 falls to a position where the reed switch 44 is opened. This switch 44 is now in the preset microswitch circuit and its opening causes the microswitch 32 to close a circuit connected to the solenoid operated valve 62. The activated solenoid opens the valve 62 so that the line 66 and the cylinder 67 are connected to the vacuum line 16. The piston 68 is thus caused to rise in the cylinder. The action of the piston rising causes the cord 71 to lift the rigid pipe 76 and the milk line extending between the pipe 76 and the claw 12. As the arm 74 extends over that end of the pipe 76 and the claw 12. As the arm 74 extends over that end of the pipe 76 adjacent the claw, this end is lifted first and the milk line 14 is thus kinked over the bevel end 77. The inflation cups, being disconnected from the vacuum in the milk line release from the animal and are drawn upwards by the cord 71 and pipe 76.

The indicator light 34 is switched off when the microswitch 32 was actuated by the reed switch 44 so that an operation can quickly determine when the milking of the animal is completed.

To enable the teat cups to be applied to another animal the reset button 37 is operated which causes the microswitch 33 to operate to disconnect the solenoid 62 and the reed switch 44 from the circuit. With the vacuum line 16 now disconnected from the cylinder 67 the piston 68 may be drawn downwards so that the teat cups can be applied to the other animal and the cycle repeated.

The manual 36 may be operated so that the control means 17 is inoperative to permit the milking apparatus to be used in the conventional manner.

The front plate 18, flow control plate 26 and float chamber 28 are molded and/or machined from a rigid synthetic plastic material, such as polycarbonate, which may be colored or clear. The float 39 is formed with the magnet 40 embedded in a polyurethane shell which is molded in a polycarbonate body.

Referring to FIGS. 7 to 9, the control means 81 illustrated is adapted to be connected between the milk line 22 (of FIG. 1) and the milk line 23 leading from the claw 12. The control means 81 comprises a cylindrical housing 82 having upper and lower end closure members 83 and 84 and gaskets 80 and 85, respectively which sealably engage with the walls of the housing f to form a sealed container. The container is divided into three separate compartments 90, 91 and 92, by transverse walls 86 and 87 and the compartments communicate with each other by means of circular holes 88 and 89 formed in the wall 86. The holes 88 and 89 are spaced from the lower closure member 84. A spherical float 93 which is of larger diameter than the holes 88 and 89 is positioned in the compartment 91 and is arranged to rest on either side of a handle 94 which extends between the wall 86 and the housing 82. Milk inlet/oulet tubes 96 and 97 extend through the lower end closure member 84 and gasket 85 into each of the coma compartments 90 and 92.

The upper gasket 80 is arranged in the form of a diaphragm and is connected through a push rod 98 to a slide piston 99 contained inside a cylinder 101 mounted on the upper closure member 83. The cylinder has a vacuum inlet port 102 and an outlet port 103 and the slide piston 99 is arranged to cover and uncover the outlet port by slidable movement being imparted thereto by the diaphragm 80 and push rod 98.

The housing 82 is pivotally supported on a bracket 104 by means of pivot pins 106 and 107 which engage in recesses in the upper and lower closure members 83 and 84.

An apertured arm 108 extends from the lower part of the bracket 104 and carries a milk flow control member 109 which is arranged to sealably engage with the bottom surface of the lower closure member 84. The control member 109 consists of a housing 111 having three integral tubes 112, 113 and 114, extending from the lower side thereof and a gasket 116 is fastened to the upper side of the housing 111. Apertures are formed in the gasket which corresponds to the positions of the tubes, and the spacing and arrangement of the tubes 112, 113 and 114 is such that, in one position of the housing, two of the tubes, say tubes 113 and 114 correspond with the position of, and communicate with, the tubes 96 and 97, respectively inside the container, and in another position of the housing the tubes 112 and 113 communicate with the tubes 96 and 97 respectively. Stops are provided on the lower closure member 84 to limit the relative movement of the flow control member 109 and the housing 82 between these positions.

In operation, the tubes 112 and 114 are connected through a Y piece to the milk line 22 and the tube 113 is connected to the milk line 23 leading to the teat cups.

With the flow control member 109 in the position as shown in FIG. 7, the vacuum in the milk line 22 lowers the pressure inside the housing 82 and causes the diaphragm 80 to move downwards so that the slide piston 99 covers the vacuum inlet port 102.

Milk from the teat cups is induced to flow into the chamber 90, through tubes 113 and 96, and through bleed aperture 117 formed at the base of the tube 96, and flows through compartments 91 and 92 via holes 88 and 89 to be withdrawn through a bleed hole 118 in the base of the tube 97. As the flow increases through the tube 96 the milk level rises in the housing 82. The float 93 which is initially adjacent the hole 88 is carried up by the rising milk level and is carried over the top of the handle 94 to a position adjacent the hole 89 by the milk flow through this hole.

When the milk flow decreases to a predetermined level, say one-half pound of milk per minute, the level of milk drops until the float 93 is drawn by the suction of the milk line 22 into sealing engagement with the hole 89 thus sealing the chamber 92 from the chambers 91 and 90. The application of the vacuum to the chambers 90 and 91 is thereby cutoff and the pressure inside these chambers and inside the milk line 23 and teat cups then rises to atmospheric. The diaphragm moves upwards causing the slide piston to uncover the vacuum inlet port 102, which is connected to the vacuum line 16, so that vacuum is applied via the outlet port 103 connected to the top of the cylinder 67 (See FIG. 6) to cause the teat cups to be removed in the manner previously described.

The control means 81 is reset for another cycle by moving it about its pivotal mounting so that the tubes 112 and 113 communicate with the tubes 96 and 97, respectively, and the milk flow through the chambers 90, 91 and 92 and is reversed.

Figure 11:
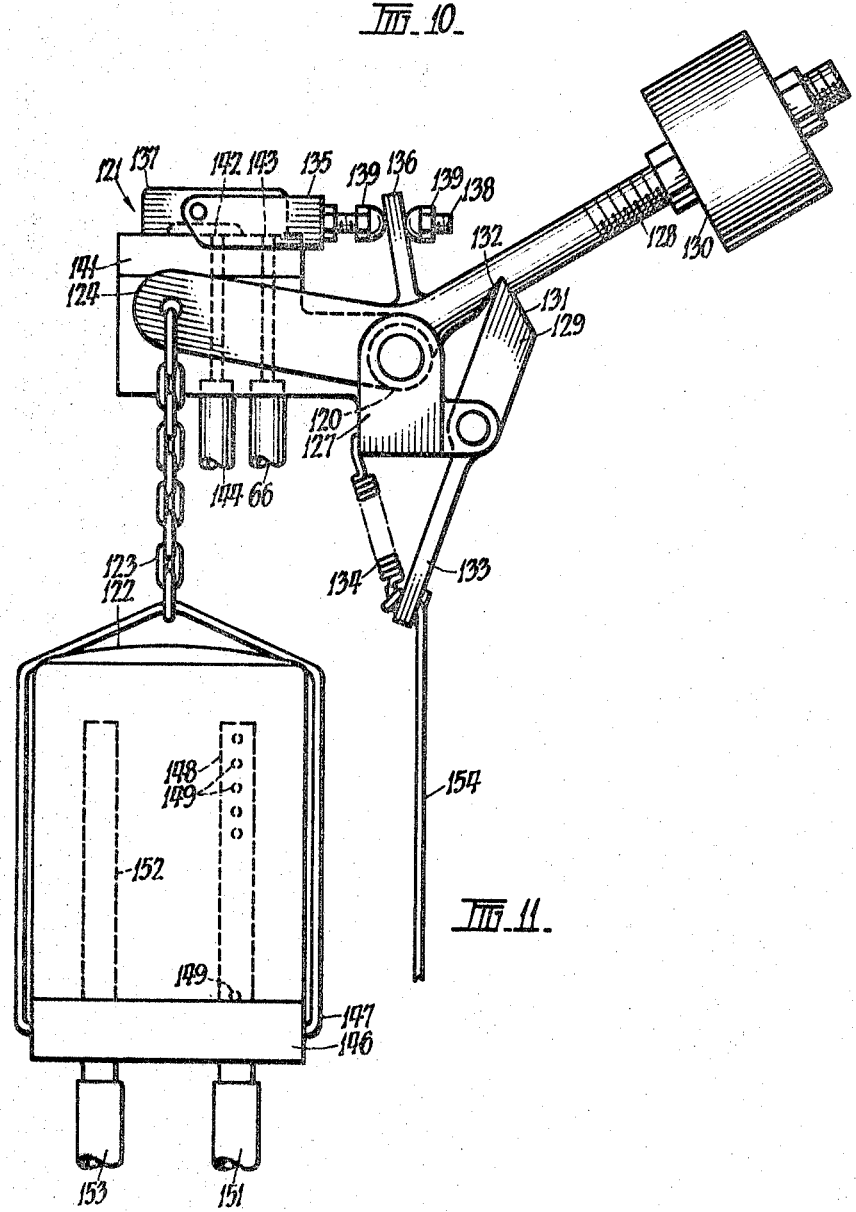
FIG. 11 is a side elevational view of the control means of FIG. 10.

Referring to the embodiment illustrated in FIGS. 10 and 11, the control means 121 shown consists of a flow control bowl 122 suspended by a chain 123 from an arm 124 which is fixed to a pivoted boss 120. The boss 120 is pivoted on a bracket 127 and a counterbalance arm 128 having a counterbalance 130 movable therealong is also fixed to the boss 120 and extends in a direction opposite to that of the arm 124.

A lever 129 is also pivoted on the bracket 127, adjacent and beneath the counterbalance arm 128, and one end 131 of the lever 129 is arranged to be releasably engaged with a notch 132 formed in the arm 128. The other end 133 of the lever 129 is engaged by the free end of the tension spring 134 which is attached to the bracket 127.

A third arm 136 is attached to the boss 120 and extends upwardly therefrom and a slide valve 137 is connected by a V-shaped bracket 135 and threaded rod 138 to the third arm 136. Adjusting nuts 139 are threaded on the rod 138 to enable the position and operation of the slide valve 137 to be fixed as desired.

The slide valve slidably moves over a valve seat 141 which is attached to the bracket 127 and having vacuum inlet aperture 142 and vacuum outlet aperture 143 formed therein. The inlet and outlet apertures 142 and 143 are connected by hoses 144 and 66 to the vacuum line 16 and the top of the cylinder 67, respectively.

The bowl 122, which has a transparent glass or synthetic plastic top part mounted on a base part 146 by means of a wire clip 147, is connected between the milk line 22 the teat cups 11. An outlet tube 148 extends into the bowl 122 and has a plurality of apertures 149 through which milk in the bowl 122 is withdrawn. The tube 148 is connected to the milk line 22 by means of rubber base 151.

An inlet tube 152 also extends into the bowl and is connected by a rubber hose 153 to the rigid pipe 76.

In operation, the counterbalance 130 is positioned on the arm 128 so that it more than balances the dry weight of the bowl 122 but does not balance the weight of the bowl when more than say half pound of milk per minute flows through the bowl 122.

With the end 131 of the lever 129 disengaged from the notch 132 in the arm 128 the slide valve 137 is positioned so that vacuum is applied to the top of the cylinder 67 and the piston 68 is in the uppermost position. A cord 154 is attached to the end 133 of the lever 129 and movement of the cord 154 and thus the lever 129 causes the end 131 of the lever to force the arm 128 upwardly until the end 131 engages in the notch 132.

The slide valve 137 is thus moved by the arm 136 acting on the rod 138 and bracket 135 so that the vacuum is cutoff from the top of the cylinder.

When the teat cups 11 are applied to the animal to be milked milk flows into the bowl 122 and thus causes it to override the counterbalance 130. The spring 134 moves the arm 129 about its pivot so that the end 131 moves away from the notch 132.

The milk in the bowl is removed through the apertures 149 and when the flow of milk decreases below about half pounds of milk per minute the counterbalance 130 becomes heavier than the bowl 122 and thus rotates about its pivot to cause the slide valve 137 to open the top of the cylinder 67 to the vacuum line and thus remove the teat cups from the animal, as previously described. The control means 121 may be reset by rotating the arm 129 by means of the cord 154.

In an alternative arrangement (not shown), a vacuum operated, or electrically operated valve is incorporated in the milk line leading from the teat cups to close this line prior to removal of the teat cups by the action of the piston 68 and cylinder 67. Also, an adjustable valve is incorporated in the vacuum line leading to the cylinder 67 to permit variation in the rate of lift of the piston 68 and thereby control the rate of removal of the teat cups from the animal.

In a further modification of the invention, a second vacuum operated cylinder and piston is pivotally mounted in a substantially horizontal position to the gate of the milking bail and a weighted cord extending from the piston engages with the gate closing arm. A valve is fitted in the first cylinder 67 (shown in FIG. 6) so that when the piston 68 reaches the top of the cylinder 67 the valve is opened to admit the vacuum to the second cylinder. The movement of the second piston responsive to the vacuum causes the gate closing arm to release from the catch and open the gate to permit the animal in the milking bail to walk out. A compression spring in the second cylinder above the piston ensures that the piston is returned to the bottom of the cylinder when the vacuum is removed so that the gate closing arm engages with its catch.

The control means 17 previously described may include further electrical circuiting so that a predetermined time after the solenoid valve has opened and the teat cups removed, the valve closes to cut off the vacuum and the teat cups, suspended from the cord 71 and rigid pipe 76 are lowered into a cleaning and/or sterilizing agent. The solenoid valve is again opened to remove the teat cups from the cleaning agent and support them until the following milking cycle.

It will be apparent from the preceding description that the invention provides a distinct method and apparatus which incorporate a plurality of novel features.

These features combine to provide a novel apparatus for use in conjunction with milking machines to remove teat cups from an animal when the animal has been milked.

We claim:

1. Apparatus for removing milking machine teat cups from milking animals comprising milk flow detecting means associated with a flexible milk line connected to a set of teat cups, said milk flow detecting means comprising flow control means having milk inlet and milk outlet connections, said milk outlet connection being connected to a milk line of the milking machine and said milk inlet connection being connected to said flexible milk line, flow rate sensing means associated with said flow control means and operable with said flow control means to sense a falling of the milk flow below a predetermined quantity, teat cup removing means operatively responsive to said milk flow detecting means to remove the teat cups from an animal when the milk flow in the milk line falls below a predetermined quantity, and actuating means responsive to said flow rate sensing means to actuate said teat cup removing means, said teat cup removing means comprising an elongated cylinder having a vacuum connection means at its upper end, a piston in said cylinder, milk line closure means connected in said flexible milk line adjacent to, but spaced from said set of teat cups, and means extending between said piston and said milk line closure means and operable by movement of said piston in said cylinder responsive to an induced vacuum in said cylinder to cause the milk line closure means to close said flexible milk line and apply tension thereto to remove said teat cups.

2. The apparatus of claim 1 wherein said flow rate sensing mean includes a float chamber having a float means therein, and said actuating means includes first electrical switch means operable by said float means.

3. The apparatus of claim 2 wherein said actuating means further includes an electrically operated vacuum valve, a vacuum source connected to said valve, electrical circuit means operatively associated with said valve, electrical circuit means operatively associated with said valve and said switch means, and vacuum connecting means between said valve and said teat cup removing means.

4. The apparatus of claim 3 wherein said electrical circuit means further includes second switch means operatively associated with said float means, relay means, and reset switch means, said second switch means being responsive to said float means to actuate said relay means to a state whereby operation of said first switch means operates said valve, and said reset switch means actuates said relay means to a state whereby said valve is not operated by said first switch means until said second switch means is operated by said float means.

5. The apparatus of claim 1 wherein said flow control means include a container having internal walls dividing said container into three compartments, each of two of said compartments having one of said milk inlet and outlet connections; openings in the walls between each of said two compartments and the third compartment, and said flow rate sensing means includes a float valve means in said third compartment operable by the milk flow through said third compartment to seal either one of said openings to seal either the first or second compartments from said third compartment when said milk flow falls to a predetermined quantity; and said actuating means includes a diaphragm in said third compartment movable by pressure change in said third compartment responsive to said float valve means, and vacuum valve means operable by said diaphragm to operatively connect a vacuum source to said teat cup removing means.

6. The apparatus of claim 5 wherein said milk inlet and outlet connections are connected to the flexible milk line and the milk line of the milking machine, respectively, through a reversing connection means mounted beneath said container, said reversing connection means having two outlet ports arranged on either side of a central inlet port and said connections means being movably mounted to position one of said two outlet ports to communicate with one of said inlet and outlet connections when the inlet port communicates with the other of said inlet and outlet ports.

7. The apparatus of claim 1 wherein said flow control means comprises a bowl suspended from an arm pivoted on a boss; and said flow rate sensing means includes a counterbalance arm means pivoted on said boss and operable to move from a first position to a second position when the milk flow through said bowl decreases to a predetermined quantity; and said actuating means includes a lever means pivoted on said boss and movable therewith, vacuum valve means operable to connect a vacuum source to said teat cup removing means, when said counterbalance arm means moves from said first to second said second position and connecting rod means between said lever means and said vacuum valve means 8. The apparatus of claim 7 wherein said flow rate sensing means further includes reset lever means pivotally mounted adjacent said counterbalance arm means and spring biased away therefrom, operating means attached to said rest lever means and operable to move said counterbalance arm means from said second to said first position when the milk flow through said bowl is below below said predetermined quantity.

9. Apparatus for removing milking machine teat cups from milking animals comprising milk flow detecting means associated with a flexible milk line connected to a set of teat cups, teat cup removing means operatively responsive to said milk flow detecting means, said milk flow detecting means comprising flow control means separate and apart form from said teat cups and having milk inlet and milk outlet connections, said milk outlet connection being connected to a milk line of the milking machine and said milk inlet connection being connected to said flexible milk line, flow rate sensing means associated with said flow control means and operable with said flow control means to sense a falling of the milk flow below a predetermined quantity, actuating means responsive to said flow rate sensing means to actuate said teat cup removing means to remove the teat cups from the animal, said teat cup removing means comprising means to close said flexible milk line and to thereafter apply tension thereto to remove said teat cups.